(12) United States Patent
Steinheider et al.

(10) Patent No.: US 7,697,573 B2
(45) Date of Patent: Apr. 13, 2010

(54) CONTROLLING JITTERING EFFECTS

(75) Inventors: Jeffrey Steinheider, Arlington, MA (US); Gerald Britton, Boston, MA (US); Victor Lum, Cambridge, MA (US)

(73) Assignee: Vanu, Inc., Cambridge, MA (US)

( * ) Notice: Subject to any disclaimer, the term of this patent is extended or adjusted under 35 U.S.C. 154(b) by 780 days.

(21) Appl. No.: 11/071,818

(22) Filed: Mar. 3, 2005

(65) Prior Publication Data

US 2005/0228854 A1 Oct. 13, 2005

Related U.S. Application Data

(60) Provisional application No. 60/550,484, filed on Mar. 5, 2004, provisional application No. 60/578,282, filed on Jun. 9, 2004.

(51) Int. Cl.
 *H04J 3/06* (2006.01)
(52) U.S. Cl. .................................. 370/516; 370/519
(58) Field of Classification Search ................ 370/432; 375/350
 See application file for complete search history.

(56) References Cited

U.S. PATENT DOCUMENTS

| | | | |
|---|---|---|---|
| 5,805,633 A | 9/1998 | Uddenfeldt | |
| 5,901,182 A | 5/1999 | Kot | |
| 5,931,964 A | 8/1999 | Beming et al. | |
| 5,973,643 A | 10/1999 | Hawkes et al. | |
| 6,016,322 A | 1/2000 | Goldman | |
| 6,035,207 A | 3/2000 | Wang et al. | |
| 6,154,507 A | 11/2000 | Bottomley | |
| 6,285,876 B1 * | 9/2001 | Zhong ........................ 455/424 |
| 6,356,911 B1 | 3/2002 | Shibuya | |
| 6,381,726 B1 | 4/2002 | Weng | |
| 6,442,392 B2 | 8/2002 | Ruutu et al. | |
| 6,490,327 B1 | 12/2002 | Shah | |
| 6,546,256 B1 | 4/2003 | Maloney et al. | |
| 6,560,462 B1 | 5/2003 | Ravi et al. | |
| 6,621,807 B1 | 9/2003 | Jung et al. | |
| 6,631,142 B2 * | 10/2003 | Miyamoto et al. .......... 370/508 |
| 6,717,947 B1 * | 4/2004 | Ghodrat et al. .......... 370/395.1 |
| 6,757,544 B2 | 6/2004 | Rangarajan et al. | |
| 6,788,750 B1 | 9/2004 | Reuven et al. | |
| 6,904,110 B2 * | 6/2005 | Trans et al. ................. 375/350 |
| 6,915,123 B1 | 7/2005 | Daudelin et al. | |
| 6,920,125 B1 | 7/2005 | Wu | |
| 6,978,124 B2 | 12/2005 | Benes et al. | |

(Continued)

OTHER PUBLICATIONS

International Search Report, PCT/US03/36709, mailed on May 25, 2004, 4 pgs.

(Continued)

*Primary Examiner*—Jayanti K Patel
*Assistant Examiner*—Jung Park
(74) *Attorney, Agent, or Firm*—Fish & Richardson P.C.

(57) ABSTRACT

Transmitting messages to mobile telephones includes determining a time a standard requires or permits a standard compliant transmission to be received by a user, and scheduling a transmission by a base station to the user in the future based on a distance between the user and a base station such that the transmission will be received by the user at the determined time. The distance between the user and the base station is a distance such that a propagation delay between the user and the base station is larger than a propagation delay accommodated by the standard.

17 Claims, 3 Drawing Sheets

U.S. PATENT DOCUMENTS

| | | | |
|---|---|---|---|
| 6,987,798 | B2 | 1/2006 | Ahn et al. |
| 7,013,150 | B2 | 3/2006 | Okanoue et al. |
| 7,068,638 | B2 | 6/2006 | Choi et al. |
| 7,139,283 | B2 * | 11/2006 | Quigley et al. ............. 370/432 |
| 2003/0012265 | A1 | 1/2003 | Lin |
| 2003/0063595 | A1 | 4/2003 | You et al. |
| 2004/0062214 | A1 | 4/2004 | Schnack et al. |
| 2004/0114623 | A1 | 6/2004 | Smith |
| 2004/0209580 | A1 | 10/2004 | Steinheider et al. |
| 2004/0252665 | A1 | 12/2004 | Clark et al. |
| 2004/0259571 | A1 | 12/2004 | Joshi |
| 2005/0163075 | A1 | 7/2005 | Malladi et al. |
| 2005/0228854 | A1 | 10/2005 | Steinheider et al. |
| 2005/0286536 | A1 | 12/2005 | Steinheider et al. |
| 2006/0007919 | A1 | 1/2006 | Bose et al. |

OTHER PUBLICATIONS

Cormen et al., 2001, Introduction to Algorithms Second Edition, McGraw-Hill, Boston.

Ekroot, L. and Dolinar, S., "A* Decoding of Block Codes", *IEEE Transactions on Communications*, vol. 44 (9):1052-1056 (1996).

Fano, "A Heuristic Discussion of Probabilistic Decoding", *IEEE Transactions on Information Theory*, vol. IT9(1):64-74 (1963).

Forney, Jr., "Convolutional Codes II. Maximum-Likelihood Decoding", *Information and Control*, vol. 25:222-266 (1974).

Forney, Jr., "The Viterbi Algorithm", *Proceedings of the IEEE*, vol. 61(3):268-278 (1973).

Han et al., "Efficient Priority-First Search Maximum-Likelihood Soft-Decision Decoding of Linear Block Codes", *IEEE Transactions on Information Theory*, vol. 39(5):1514-1523 (1993).

Han et al., "A Maximum-Likelihood Soft-Decision Sequential Decoding Algorithm for Binary Convolutional Codes", *IEEE Transactions on Communications*, vol. 50(2):173-178 (2002).

Heller, J. and Jacobs, I. M., "Viterbi Decoding for Satellite and Space Communication", *IEEE Transactions on Communication Technology*, vol. Com-19(5):835-848 (1971).

Kang, G. and Zhang, P., "The Implementation of Viterbi Decoder on TMS320C6201 DSP in WCDMA System", *Beijing University of Posts and Telecommunications*.

Rajagopal, S., "A Real-Time Baseband Communications Processor for High Data Rate Wireless Systems", Dept. of Electrical and Computer Engineering, Rice University (2002).

Sereni et al., "A Software Re-Configurable Architecture for 3G and Wireless Systems", University of Perugia, Italy (2000).

Varga, R. and Harrison, M. (eds), The Art of Computer Programming-Second Edition, Addison-Wesley, Massachusetts (1973).

Viterbi, "Error Bounds for Convolutional Codes and an Asymptotically Optimum Decoding Algorithm", *IEEE Transactions on Information Theory*, vol. IT-13(2):260-269 (1967).

Wicker, S. B., Error Control Systems for Digital Communication and Storage, Prentice Hall, Englewood Cliffs, NJ (1995).

International Search Report—PCT/US03/25218.

M. Abramowitz, et al, *Handbook of Mathematical Functions with Formulas, Graphs and Mathematical Tables*, Dover Publications, New York, 1965.

J.L. Massey, *Threshold Decoding*, Technical Report 410, MIT Press, Cambridge, MA, 1963.

K. Paterson, et al., *Efficient Decoding Algorithms for Generalised Reed-Muller Codes*, Technical Report, Hewlett-Packard Labs, Nov. 1998.

Bob Pearson, *Complementary Code Keying Made Simple*, Application Note 9850, http://www/intersil.com/data/an/an9/an9850/an9850.pdf, May 2000.

I. Reed, *A Class of Multiple-Error-Correcting Codes and the Decoding Scheme*, IRETransactions on Information Theory, PGIT-4:38-49, Sep. 1954.

R. van Nee, *OFDM Codes for Peak-to-Average Power Reduction and Error Correction*, In Proc. IEEE Globecom '96, London, England, pp. 740-744, Nov. 1996.

G.N. Watson, *A Treatise on the Theory of Bessel Functions*, Second Edition, Cambridge University, Press, 1952.

R.K. Yarlagadda, et al., *Hadamard Matrix Analysis and Synthesis*, Luwer Academic Publishers, Ddordrecht, 1997.

International Search Report PCT/US03/25219 mailed Dec. 16, 2003.

http://www.fcc.gov/911/enhanced/.

http://www.arraycomm.com/.

EIA/TIA/IS-95 Mobile Station-Base Station Compatibility Standard for Dual-Mode Wideband Spread Spectrum Cellular System, Telecommunications Industry Association, Jul. 1993, pp. 6-1 to 6-8.

L. Trevisan, "Some Applications of Coding Theory in Computational Complexity," Quaderni di Matematica, vol. 13, pp. 347-424, 2004.

J.S. Lee and L.E. Miller, CDMA Systems Engineering Handbook, Artech House, Boston, 1998.

A.J. Viterbi, CDMA: Principles of Spread Spectrum Communication, Addison-Wesley, Reading, MA, 1995.

A.V. Oppenheim and R.W. Schafer, with J.R. Buck, Discrete-Time Signal Processing, 2nd ed., Prentice Hall, Upper Saddle River, NJ, 1999.

V.S. Pless and W.C. Huffman, Eds., Handbook of Coding Theory, vol. 1, Elsevier Science, Amsterdam, 1998.

S.J. MacMullan and O.M. Collins, "A Comparison of Known Codes, Random Codes, and the Best Codes," IEEE Transactions on Information Theory, vol. 44, No. 7, pp. 3009-3022, Nov. 1998.

M. Luby, "LT-codes," in Proceedings of the 43rd Annual IEEE Symposium on the Foundations of Computer Science (FOCS), pp. 271-280, 2002.

A. Shokrollahi, "Raptor codes," in Proceedings of the IEEE International Symposium on Information Theory, p. 36, 2004.

International Search Report, PCT/US05/07136, mailed on Dec. 26, 2006, 6 pgs.

* cited by examiner

CONTROLLING JITTERING EFFECTS

PRIORITY TO OTHER APPLICATIONS

This application claims priority from and incorporates herein U.S. Provisional Application No. 60/550,484, filed Mar. 5, 2004, and titled "CONTROLLING JITTERING EFFECTS" and U.S. Provisional Application No. 60/578,282, filed Jun. 9, 2004 and titled "EXTENDING THE REACH OF FREQUENCY HEADS".

TECHNICAL FIELD

The following description relates to signal processing.

BACKGROUND

There are several platforms available today to a system developer wishing to perform signal processing tasks. These platforms include General Purpose Processors (GPPs), Digital Signal Processors (DSPs), Field Programmable Gate Arrays (FPGAs), Application Specific Integrated Circuits (ASICs) and hardware. GPPs have become increasingly popular platforms for signal processing tasks for several reasons. GPPs, however, present challenges that are not present in traditional signal processing platforms. Even the DSP, which is the platform most similar to the GPP, remains significantly different in architecture and software environments. The differences are even more pronounced when considering the system context.

A DSP is typically placed in a board with a memory and an input/output (I/O) subsystem designed for high-speed data streaming. In contrast, GPPs are typically designed into boards with multilevel cache memory systems tuned for data reuse. GPP board I/O busses focus on interoperability and ease of system integration, rather than simplicity or raw data streaming efficiency. The end result is that GPP chips and boards present a variety of challenges, which a designer attempts overcome in order to achieve efficient signal processing.

It is an important object of the invention to provide a method and apparatus for improving the performance of signal processing applications on GPPs and the like having jitter effects.

BRIEF SUMMARY OF THE INVENTION

Despite the challenges, GPPs are attractive platforms for some signal processing applications. Development cost and time-to-market can be significantly reduced. Parts count can be reduced since many target platforms have a GPP in any case. Further, the highest available raw computing power by some metrics is available in high-clock-rate GPPs, rather than in DSPS. Therefore, controlling the jitter effects allows a user to capitalize on the advantages of the GPP boards.

In one aspect, the invention is a method.
In another aspect, the invention is an apparatus.
In still another aspect, the invention is an article In a general aspect, a method for transmitting messages to mobile telephones includes determining a time a standard requires or permits a standard compliant transmission to be received by a first user. The method also includes scheduling a transmission by a base station to the first user in the future based on a distance between the user and a base station such that the transmission will be received by the first user at the determined time.

The method can also include associating a second timeslot of a transmission with a second one of the plurality of users based on a distance between the second user and a base station. The method can also include transmitting a message via a data link to a radio transmitter that up-converts and transmits such message at the scheduled time. The method can also include transmitting messages to mobile telephones over distances at which the propagation delay in a communication standard that employs time division multiplexing to share a radio channel among a plurality of users would make such communication non-compliant with the timing requirements of the standard. Scheduling a transmission can include scheduling a transmission from the base station to the user over a data link. The data link can be fiber optic, free space optics, radio frequency, or ethernet.

In an additional general aspect, an apparatus for transmitting messages to mobile telephones can be configured to determine a time a standard requires or permits a standards compliant transmission to be received by a first user and schedule a transmission by a base station to the first user in the future based on a distance between the user and a base station such that the transmission will be received by the first user at the determined time.

In a general aspect, a method of controlling timing of outputs of a radio system includes processing tasks faster than necessary for a desired output rate and scheduling transmissions or other outputs in the future.

The method can also include performing computational tasks faster than real time. The method can also include generating base-band digital samples as outputs for up-conversion and transmission at radio frequencies. The method can also include maintaining a sufficient buffer to ensure jitter effects associated with a system do not degrade system performance.

In a general aspect, a method of controlling jitter effects includes scheduling transmissions or other outputs in the future, performing computational tasks faster than real time, and maintaining sufficient buffer to ensure jitter effects associated with a system do not degrade system performance.

In another general aspect, an apparatus for controlling jitter effects includes a memory that stores executable instruction signals and a processor that executes the instruction signals. The instruction signals can include instruction signals to perform processor tasks faster than necessary for a desired output rate and schedule transmissions or other outputs in the future.

In an additional general aspect, an article including a machine-readable medium that stores executable instruction signals for controlling jitter effects is configured to cause a machine to perform processor tasks faster than necessary for a desired output rate and schedule transmissions or other outputs in the future.

In a general aspect, a method of controlling effects of variation in computational latency includes allocating a processing cost per computation that is less than a maximum processing cost and greater than an average processing cost and handling a task requiring a processing time greater than the allocated processing cost as a source of jitter.

Handling a task requiring a processing time greater than the allocated processing cost as a source of jitter can include performing computational tasks and scheduling transmission of an output in the future. Handling a task requiring a processing time greater than the allocated processing cost as a source of jitter can include receiving a task that requires a processing time greater than the allocated processing cost and performing the task such that the delay between completion of the task and transmission is less than the delay between completion of a task having an average computational latency. The method can also include scheduling transmission before a deadline for the transmission.

In another general aspect, an apparatus for controlling effects of variation in computational latency is configured to allocate a processing cost per computation that is less than a maximum processing cost and greater than an average processing cost and handle a task requiring a processing time greater than the allocated processing cost as a source of jitter.

Other features, objects and advantages will become apparent from the following detailed description when read in connection with the accompanying drawing in which:

DETAILED DESCRIPTION OF THE INVENTION

Figure 1:
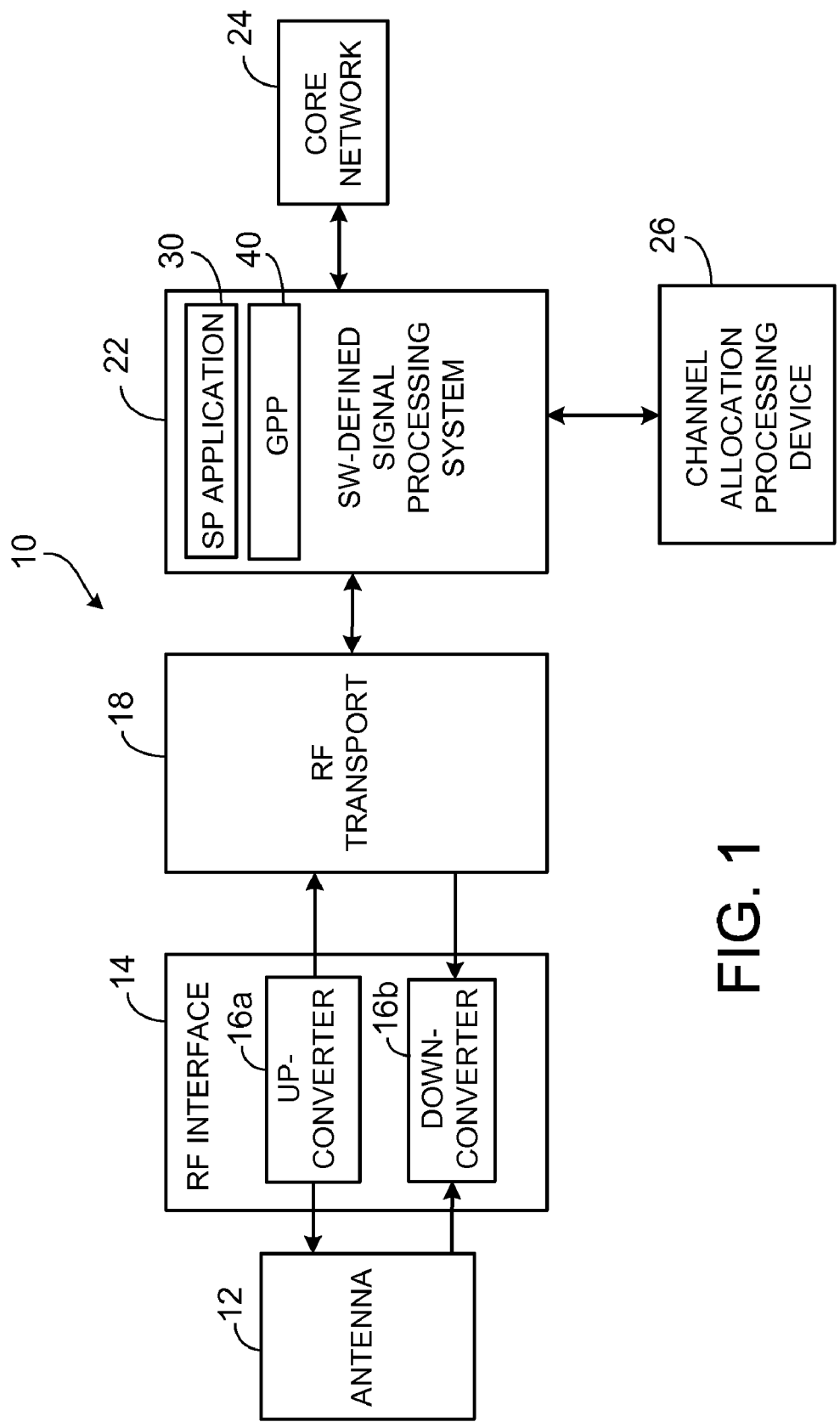
FIG. 1 is a block diagram of a wireless communication system.

Referring to FIG. 1, a wireless communications system 10 includes an antenna 12, a radio frequency (RF) interface 14, a digital RF transport mechanism 18, a software (SW) signal processing system 22, a core network 24 (e.g., a wireless service provider) and a channel-allocation processor device 26. The RF interface 14 transmits and receives RF signals through antenna 12 using an up-converter 16a and a down-converter 16b. For example, when a signal is received, the down-converter 16b converts the signal from an RF signal to an intermediate frequency (IF) or baseband signal and digitizes the resultant signal. When a signal is transmitted, the up-converter 16a converts the signal from a baseband or IF signal to an RF signal and amplifies the RF signal for transmission. The up-converter 16a and down-converter 16b may use a block of spectrum that contains more than one channel. The up converter 16a and down-converter 16b may be single-stage or multi-stage converters, for example heterodyne converters.

The digital RF transport mechanism 18 transports digital samples between the RF interface 14 and the software-defined signal processing system 22. In one embodiment, the RF transport mechanism 18 may be include fiber lines extending over many miles with a network interface that are connected to the software-defined signal processing system. In another embodiment, transport mechanism 18 includes a peripheral component interconnect (PCI) card having an analog-to-digital (A/D) converter and a digital-to-analog (D/A) converter on the PCI card, which transports the data into and out of the software-defined signal processing system 22 via the PCI bus. In another embodiment, transport mechanism 18 includes an Ethernet connection between the RF interface 14 and the software-defined signal processing system 22.

The software-defined signal processing system 22 processes the digitized signals in accordance with the specification for one or more communication standards for signals received from internal network 24 or signals processed for the internal network. The particular processing being performed by the system 22 is to define generic servers by loading onto such servers software specific to a communication standard required by the communications system 10. Thus, system 22 can be used to implement multiple communication standards using the same hardware. An example of the software-defined signal processing system and wireless communication system are found in U.S. Pat. No. 6,584,146 entitled "SYSTEMS AND METHODS FOR WIRELESS COMMUNICATION", by Vanu Bose et al., which is incorporated in its entirety herein.

Software-defined signal processing system 22 includes a signal processing application 30 that runs on a GPP 40.

Building signal processing systems on GPP is fundamentally different from using a DSP or other signal processing platform. Signal processing systems include some jitter, which is a random variation in the time required to complete any particular task. At the lowest levels of the system, the jitter is due to hardware effects, such as the relative time at which two chips request access to a shared bus. At higher levels, the jitter comes from software effects such as interrupts.

In typical DSP system designs, the jitter is controlled tightly. The signal processing application experiences smooth run rates down to microsecond time scales. Thus, on a DSP, each step of the signal processing work is typically executed within a tightly constrained timeframe and the time at which any particular step is completed may be determined by adding together the time taken to perform all of the previous steps. Although some jitter is introduced by each step, it is a design constraint of such systems to manage this jitter so the total cumulative jitter is within that required by the specification for the communication standard implemented on such DSP.

On the RF transport 14 and the software defined signal processing subsystem 22, including the GPP 40, the time at which any step of the work is performed work is substantially less predictable. Instead, the system relies on the completing all of the necessary work in advance of the time required and scheduling the transmission of the output corresponding to such work in accordance with communication standard requirements.

In an off-the-shelf GPP board 40, jitter control is not a critical design goal. As a result, jitter on GPP board 40 is orders of magnitude higher than in a DSP board. Jitter develops at multiple levels. For example, the out-of-order execution pipeline of a modern day processor contributes cycle-level variations. In another example, data cache misses cause unpredictable pauses of tens or hundreds of cycles. In still another example, input/output (I/O) interrupts in an operating system (OS) kernel may cause delays of a substantial fraction of a millisecond. Also, time slicing of the processor among multiple applications leads to millisecond level jitter or higher.

The issue that fundamentally changes application programming is not the absolute level of jitter, but that for many signal-processing tasks, the jitter on a GPP 40 is higher than the required timing accuracy. For example, a software defined radio (SDR) implementation of a GSM cellular base station is a normal C/C++ application running as a user level Linux process. The SDR implementation initiates transmission within a 3-microsecond window at the start of a timeslot in order to meet a specification requirement for certain handoff operations. Yet, the SDR application is executing on a system where it cannot assure its behavior on time scales less than a millisecond.

A solution to the timing accuracy problem is to execute the signal processing application 30 in a manner that processes signals faster than is needed to meet the required output rate and schedules outputs in the future at the times required or allowed by the relevant communication standard. It is important to note that the time needed to perform any particular step of a signal processing application may vary. Some steps may even take longer than would be sustainable indefinitely in light of the communication protocol's timing requirement, so long as the step is completed in time for the required output.

In other words, if the system performs a series of steps ahead of their scheduled output time, it may spend more time performing signal processing tasks on a subsequent sample, while still meeting overall timing requirements.

A process 50 is an exemplary process to ensure a system design for a platform exhibiting jitter can continue to process signals in accordance with the relevant communications protocol.

A. Computational Signal Processing Running Faster Than Real Time

Process 50 establishes (60) that the signal processing computation runs faster than real time.

Each block of input data samples corresponds to a certain amount of real time, which is the sample period times the number of samples. For example, for a block of 64 samples captured with a 1 megasample per second A/D converter equates to 64 microseconds. If the block of 64 samples were presented to the signal processing application 30, a base amount of computation, ignoring jitter effects such as cache misses and operating system (OS) interrupts, would be required, for example, to be no more than 45 microseconds.

The "unused" performance, in this case (64 microseconds-45 microseconds)/64 microseconds=30% of a raw arithmetic-logic unit (ALU) pipeline speed, is what will pay for the jitter effects. One is not limited to delays of 64 microseconds−45 microseconds=19 microseconds. As will be described, the other blocks of process 50, controlling output timing (70) and maintaining sufficient latency (80) enable the signal processing application 30 to tolerate much longer jitter delays.

B. Output Timing Control

Process 50 employs a way to control (70) output timing.

Format conversion subsystems, which handle the conversion of signals from analog to digital or from digital to analog formats, support a mechanism for the signal processing application 30 to precisely control total latency through the system. For example, in an SDR system 22, input and output timestamps are used for this purpose. An input timestamp indicates a time at which that data sample was captured by the A/D converter. An output timestamp generated by the signal processing application 30 indicates the time at which that data sample should be processed by the D/A converter or other output means. An output timestamp is compared to the clock in the D/A converter and the output queue stalls until D/A clock catches up to the timestamp. Synchronizing clocks on the A/D and D/A converters enables cycle or sample counts to be used as timestamps.

If cycle or sample counts are used, a hardware mechanism is provided to assure that all the converters start processing at the same time, or in a defined absolute time relationship to each other. If this feature is omitted, the signal processing application 30 will not be able to precisely determine the wallclock time relationship between an input and output sample number.

Precise control of the time between when an input is presented to the system and the time at which the corresponding output is produced enables the signal processing application 30 to hit a precise transmission time in the future. That is, at time 10.000 seconds the signal processing application 30 may be computing digital samples for an RF transmission that will occur at time 10.002 seconds. The payoff to the design is that the application code does not need to know whether it is executing at time 9.999, 10.000, or 10.001 seconds. The application computation can be completed at any time and its scheduled transmission will go out at precisely the correct 10.002 second timeslot.

Output timing control thus enables the signal processing application 30 to work ahead and tolerate jitter higher than its required timing precision.

C. Sufficient Latency:

Process 50 maintains (80) sufficient latency through the system to compensate for the total expected jitter.

For example, consider a case where an input sample comes out of the A/D converter at 10.000 seconds. If the signal processing application 30 does not know when it will complete a 2 millisecond signal processing task within a ±1 millisecond window, the earliest it can plan to produce the corresponding output sample is at 10.003 seconds. If the system designer tries to reduce end-to-end latency through the system to less than 3 milliseconds, the jitter effects will cause the signal processing application 30 to occasionally miss an output deadline. The symptom of missing a deadline is an underrun in the D/A converter's (or other output device's) input queue. An underrun occurs when the converter tries to retrieve data for processing and none is available.

There is a close relationship between how much faster than real time the signal processing runs (60) and the minimum achievable latency through the system (80). If the signal processing runs significantly faster than real time, the signal processing application 30 can quickly catch up if it is stalled due to jitter. Therefore, a short output queue of scheduled transmission data is sufficient. On the other hand, if signal processing is only a little faster than real time, a longer output queue is needed to avoid underruns.

When signal processing is much faster than real time, processor utilization is low. Therefore, there is a tradeoff between efficiency and latency. As efficiency increases, meaning fewer unused processor resources, the required latency also increases. The slope of the line relating efficiency and latency is determined by the total jitter of the system.

Traditional signal processing algorithm design requires fixed processing cost per input sample or block. If the algorithm is faster in some cases than others, sufficient time is allocated for the worst-case scenario.

In the system described herein, variations in signal processing computation latency can be treated as simply another source of jitter. Therefore, the system can be designed to run more quickly in the common case, and if it runs into an uncommon case that requires more computation, it will catch up from that delay without missing any deadlines. To make this safe, the designer performs sufficient statistical analysis on the input data to assure that the uncommon case really is uncommon enough for the system to run reliably without underruns or the designer assures that an occasional underrun will not adversely effect overall system performance in an unacceptable manner.

Figure 3:
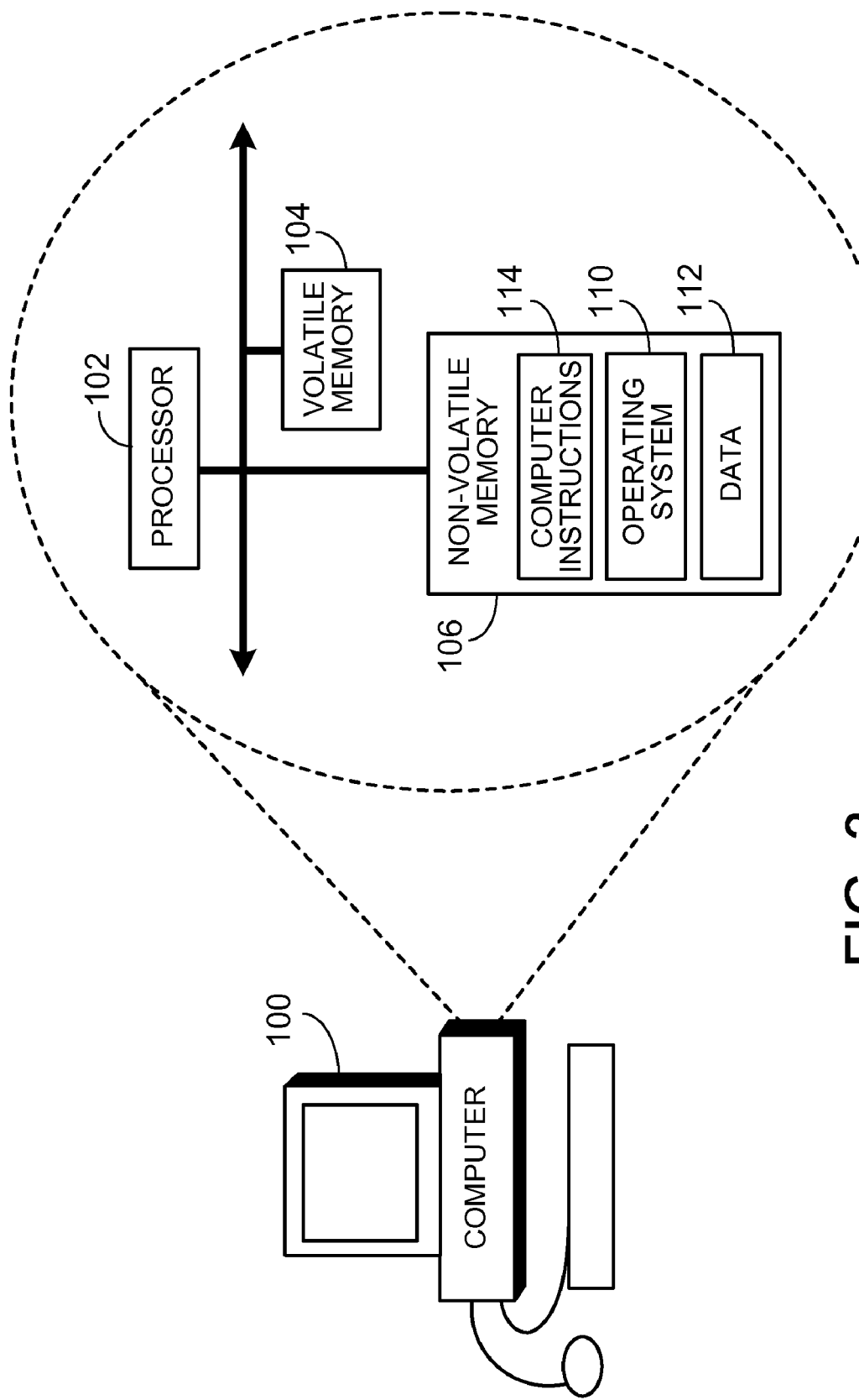
FIG. 3 is a block diagram of a computer system on which the process of FIG. 1 may be implemented.

FIG. 3 shows a computer 100 for using process 50. Computer 100 includes a processor 102, a volatile memory 104, and a non-volatile memory 106 (e.g., hard disk). Non-volatile memory 106 stores operating system 110, data storage 112, and computer instructions 114 which are executed by processor 102 out of volatile memory 104 to perform process 50.

Process 50 is not limited to use with the hardware and software of FIG. 3; the process may find applicability in any computing or processing environment and with any type of machine that is capable of running a computer program. Process 50 may be implemented in hardware, software, or a combination of the two. For example, process 50 may be implemented in a circuit that includes one or a combination of a processor, a memory, programmable logic and logic gates. Process 50 may be implemented in computer programs executed on programmable computers/machines that each includes a processor, a storage medium or other article of manufacture that is readable by the processor including volatile and non-volatile memory and/or storage elements), at least one input device, and one or more output devices. Program code may be applied to data entered using an input device to perform process 50 and to generate output information.

Each such program may be implemented in a high level procedural or object-oriented programming language to communicate with a computer system. However, the programs can be implemented in assembly or machine language. The language may be a compiled or an interpreted language. Each computer program may be stored on a storage medium or device e.g., CD-ROM, hard disk, or magnetic diskette that is readable by a general or special purpose programmable computer for configuring and operating the computer when the storage medium or device is read by the computer to perform process 50. Process 50 may also be implemented as one or more machine-readable storage media, configured with a computer program(s), where upon execution, instructions in the computer program(s cause a computer to operate in accordance with process 50.

Figure 2:
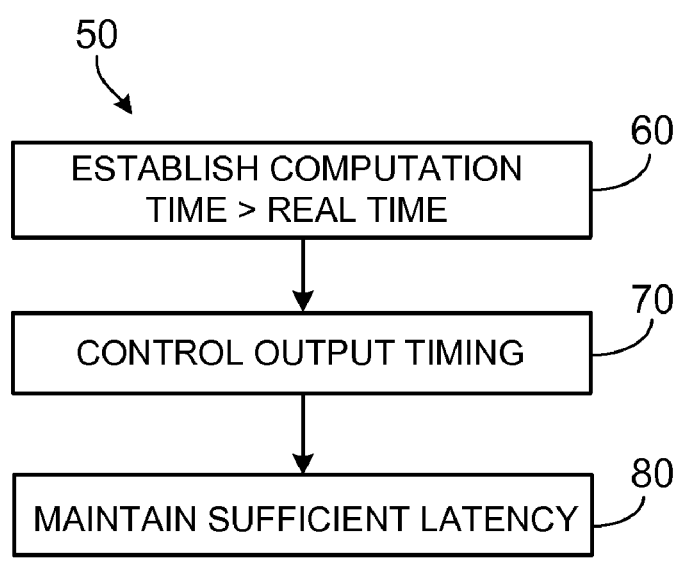
FIG. 2 is a process for controlling jitter.

Process 50 is not limited to the specific embodiments described herein. For example, process 50 is not limited to the specific processing order of FIG. 2. Rather, the blocks of FIG. 2 may be re-ordered, as necessary, or blocks may be removed to achieve the results set forth above.

In some embodiments, a system can compensate for the delay in the transport path by creating an association between the signal at the transmitter and the one at the receiver. By changing this association, one can account for the time of flight through the RF transport system. For example, a software radio implementation can make this approach possible, since the association between the time of transmission is decoupled from the generation and processing of the data to be transmitted. A timestamp identifies the actual time associated with a particular data set, thus modifying the timestamp changes the association of the signal at the transmitter and receiver.

The system can require synchronization between the receive and transmit time slots. This timing is measured between the radiating point (antenna) and the mobile subscriber unit. By locating the antenna remotely, the RF transport media adds additional delay to this path, which causes an offset in the timing. If the optical fiber is long enough, the delay through the RF transport can be greater than the allowable time difference between receive and transmit, placing a limit on how far the RF transport can reach.

The system can compensate for the delay in the transport path by creating an association between the signal at the transmitter and at the receiver. By changing this association, the system can account for the time of flight through the RF transport system. The system has a module which correlates output samples with receive samples. By modifying that module to add an offset, the timing offset is created, which is needed to compensate for the transport delay. This has the same effect as virtually moving the transceiver up the RF transport path.

In some additional embodiments, a radio channel can be shared by multiple users by time-division multiplexing those users. In such an embodiment, each user is assigned a time slot and instructed to transmit at a particular time. The assigned time slot can be based on the time a signal is to be transmitted and the distance between the user and a base station. Since the assigned timeslot is based on the distance to the base station, when the user's signal reaches the base station antenna, it will fall into its allotted time slot. Thus, even though some users may be near to the base station and others farther away the signals will align with the correct assigned timeslots.

In some embodiments, a signal is transmitted in advance of the time that a standard system would transmit the signal. Thus the user appears to be closer to a base station than it actually is and the user can maintain connectivity where a traditional system (using traditional timing mechanisms) would not maintain connectivity.

There has been described novel apparatus and techniques for controlling jitter effects. It is evident that those skilled in the art may now make numerous modifications and uses of and departures from specific apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims.

Other implementations are within the scope of the following claims:

The invention claimed is:

1. A method of controlling timing of outputs of a radio system, comprising:
   determining an amount of time specified by a communications standard for processing tasks in order to achieve a desired output rate;
   processing some of the tasks faster and using an amount of time shorter than the amount of time specified by the communications standard for the desired output rate;
   processing some of the tasks using an amount of time that is longer than the amount of time specified by the communications standard for the desired output rate; and
   scheduling transmissions or other outputs at the desired output rate in the future;
   wherein processing some of the tasks using an amount of time shorter and processing some of the tasks using an amount of time longer than the amount of time specified by the communications standard comprises using a general purpose processor board to process the tasks, the general purpose processor board having jitter that is an order of magnitude greater than a timing accuracy required by the communications standard.

2. The method of claim 1, further comprising:
   performing computational tasks faster than real time.

3. The method of claim 1, further comprising:
   generating baseband digital samples as outputs for up-conversion and transmission at radio frequencies.

4. The method of claim 1, further comprising:
   maintaining a sufficient buffer to ensure jitter effects associated with a system do not degrade system performance.

5. The method of claim 1 in which the jitter is caused by at least one of an out-of-order execution, a data cache miss, an input/output interrupt, and time slicing of a processor among multiple applications.

6. The method of claim 1 in which the jitter has a level greater than a timing accuracy required by the communications standard for processing the tasks to achieve the desired output rate.

7. The method of claim 1 in which the general purpose processor board has a jitter that is more than 10 times the timing accuracy required by the communications standard.

8. The method of claim 1 in which the general purpose processor board has a jitter that is more than 100 times the timing accuracy required by the communications standard.

9. The method of claim 1, comprising meeting overall timing requirements specified by the communications standard when some of the tasks are processed using an amount of time that is longer than the amount of time specified by the communications standard for the desired output rate.

10. Apparatus for controlling timing of outputs of a radio system, comprising:
a general purpose processor board that comprises:
a memory that stores executable instructions; and
a processor that executes the instructions to:
determine an amount of time specified by a communications standard for processing tasks in order to achieve a desired output rate:
perform some of the tasks faster and using an amount of time shorter than the amount of time specified by the communications standard for the desired output rate;
perform some of the tasks using an amount of time longer than the amount of time specified by the communications standard for the desired output rate; and
schedule transmissions or other outputs at the desired output rate in the future;
wherein the general purpose processor board has jitter that is an order of magnitude greater than a timing accuracy required by the communications standard.

11. The apparatus of claim 10 in which the memory stores executable instructions that when executed by the processor causes the processor to perform computational tasks faster than real time.

12. The apparatus of claim 10 in which the memory stores executable instructions that when executed by the processor causes the processor to generate baseband digital samples as outputs for up-conversion and transmission at radio frequencies.

13. The apparatus of claim 10 in which the jitter is caused by at least one of an out-of-order execution, a data cache miss, an input/output interrupt, and time slicing of a processor among multiple applications.

14. The apparatus of claim 10 in which the jitter has a level greater than a timing accuracy required by the communications standard for processing the tasks to achieve the desired output rate.

15. The apparatus of claim 10 in which the general purpose processor board has a jitter that is more than 10 times the timing accuracy required by the communications standard.

16. The apparatus of claim 10 in which the general purpose processor board has a jitter that is more than 100 times the timing accuracy required by the communications standard.

17. The apparatus of claim 10 in which the processor meets overall timing requirements specified by the communications standard when some of the tasks are processed using an amount of time that is longer than the amount of time specified by the communications standard for the desired output rate.

* * * * *